United States Patent
Bouten

(10) Patent No.: US 9,462,799 B2
(45) Date of Patent: Oct. 11, 2016

(54) PIVOT HINGE BOOM SPRAY SYSTEM
(71) Applicant: AGCO Corporation, Hesston, KS (US)
(72) Inventor: Petrus Henricus Johannes Bouten, Jackson, MN (US)
(73) Assignee: AGCO Corporation, Duluth, GA (US)
( * ) Notice: Subject to any disclaimer, the term of this patent is extended or adjusted under 35 U.S.C. 154(b) by 91 days.
(21) Appl. No.: 14/574,839
(22) Filed: Dec. 18, 2014
(65) Prior Publication Data
US 2015/0201552 A1  Jul. 23, 2015

Related U.S. Application Data

(60) Provisional application No. 61/917,724, filed on Dec. 18, 2013.

(51) Int. Cl.
| | |
|---|---|
| *F16M 13/00* | (2006.01) |
| *A01M 7/00* | (2006.01) |
| *A01B 73/06* | (2006.01) |
| *A01C 23/00* | (2006.01) |

(52) U.S. Cl.
CPC .......... *A01M 7/0075* (2013.01); *A01B 73/065* (2013.01); *A01C 23/008* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 3,731,879 | A | * | 5/1973 | Hoegen Dijkhof | A01M 7/0053 212/279 |
| 4,044,952 | A | * | 8/1977 | Williams | A01M 7/0075 137/615 |
| 4,379,522 | A | * | 4/1983 | Elliott | A01M 7/0078 239/167 |
| 4,529,043 | A | * | 7/1985 | Jensen | A01B 73/046 172/311 |
| 4,561,591 | A | * | 12/1985 | Ballu | A01M 7/0053 239/159 |
| 4,588,128 | A | * | 5/1986 | Broyhill | A01M 7/0075 239/168 |
| 4,615,397 | A | * | 10/1986 | Hastings | A01B 73/046 172/311 |
| 4,629,123 | A | * | 12/1986 | Gorder | A01M 7/006 239/159 |
| 4,650,117 | A | * | 3/1987 | Dudley | A01M 7/0053 239/168 |
| 4,736,888 | A | * | 4/1988 | Fasnacht | A01M 7/005 239/161 |
| 4,867,245 | A | * | 9/1989 | Stevens | A01B 73/046 172/311 |
| 4,880,160 | A | * | 11/1989 | Patterson | A01M 7/0053 172/126 |
| 5,251,704 | A | * | 10/1993 | Bourgault | A01B 49/04 172/247 |
| 5,310,115 | A | * | 5/1994 | Broyhill | A01M 7/0075 239/168 |
| 5,326,030 | A | * | 7/1994 | Benest | A01M 7/0014 239/1 |
| 5,992,759 | A | * | 11/1999 | Patterson | A01C 23/00 239/159 |
| 6,027,039 | A | * | 2/2000 | Mercil | A01M 7/0075 239/159 |
| 6,059,201 | A | * | 5/2000 | Weddle | A01M 7/0078 239/159 |
| 6,131,821 | A | * | 10/2000 | Nejsum | A01M 7/0064 239/168 |
| 6,202,941 | B1 | * | 3/2001 | Baek | A01M 7/0014 239/161 |
| 7,077,070 | B1 | * | 7/2006 | Williams | A01C 23/024 111/121 |
| 7,631,817 | B2 | * | 12/2009 | Thompson | A01M 7/0075 180/53.3 |
| 9,049,854 | B2 | * | 6/2015 | Ellsworth | A01M 7/0053 |
| 2004/0195356 | A1 | * | 10/2004 | Ellsworth | A01M 7/0053 239/166 |
| 2004/0238659 | A1 | * | 12/2004 | Wubben | A01M 7/0075 239/166 |
| 2006/0219809 | A1 | * | 10/2006 | Thompson | A01M 7/0075 239/159 |
| 2006/0255175 | A1 | * | 11/2006 | Thompson | A01M 7/0075 239/168 |
| 2011/0139895 | A1 | * | 6/2011 | Kuphal | A01M 7/0053 239/166 |
| 2012/0043396 | A1 | * | 2/2012 | Joris | A01M 7/0053 239/164 |
| 2012/0237284 | A1 | * | 9/2012 | Bouten | A01M 7/0078 403/111 |
| 2012/0273063 | A1 | * | 11/2012 | Honermann | A01M 7/00 137/342 |
| 2013/0043326 | A1 | * | 2/2013 | Muff | A01C 23/028 239/159 |
| 2013/0092753 | A1 | * | 4/2013 | Barker | A01M 7/0075 239/163 |

* cited by examiner

*Primary Examiner* — Monica Millner

(57) ABSTRACT

A spray assembly includes a support element by which the spray assembly is attached to a vehicle, a first load carrying arm selectively extendable from the support element, and a first nozzle carrying arm attached to the first load carrying arm and having at least two sections connected at a first joint. At least one of the two sections is selectively extendable from the first load carrying arm. A crop sprayer including a vehicle and an attached spray assembly is also disclosed. A method of deploying a spray boom system is disclosed, wherein a support element of the spray boom system is attached to a vehicle. The method includes selectively extending a first load carrying arm from the support element and selectively extending at least one of two sections of a first nozzle carrying arm from the first load carrying arm.

19 Claims, 20 Drawing Sheets

PIVOT HINGE BOOM SPRAY SYSTEM

CROSS REFERENCE TO RELATED APPLICATION

This application claims the benefit of U.S. Provisional Application No. 61/917,724, entitled PIVOT HINGE BOOM SPRAY SYSTEM, filed Dec. 18, 2013, which is hereby incorporated by reference in its entirety.

BACKGROUND OF THE INVENTION

1. Field of Invention

This invention relates generally crop sprayer vehicles, and more particularly to a crop sprayer vehicle with a folding boom structure.

2. Description of Related Art

The high crop yields of modern agribusiness typically use applications of fertilizers, pesticides, herbicides, fungicides and other chemicals to protect the crops from diseases and insects and to facilitate the growth and harvest of the crops. Dispersion of these chemicals onto high acreage fields is accomplished by specialized machines mounted on or towed by a vehicle. An example of such a machine is a self-propelled crop sprayer.

A common design for a self-propelled crop sprayer includes a dedicated chassis with a tank, boom arms connected to and extending from the chassis, and spray nozzles connected to the boom arms. The tank contains fluid such as fertilizers, pesticides, and herbicides. Boom arms extend outward from the sides of the dedicated chassis. The boom plumbing includes supply lines and a plurality of nozzles spaced apart along the length of the boom arms. Typically, the nozzles are positioned with a standard spacing distance that corresponds to a spray pattern of the nozzles. In operation, as the crop sprayer traverses a field, fluid is pumped from the tank through the supply lines along the boom arms, and out through the nozzles. This allows the self-propelled sprayer to distribute the fluid along a relatively wide path. The total length (e.g., span) of a conventional boom arm assembly may vary from, for example, 6 meters (18 feet) up to 46 meters (150 feet), but smaller or longer booms are possible. The boom arms typically swing in for transport and out for operation.

FIG. 1 shows a prior art crop sprayer 10 that can be used to deliver chemicals to agricultural crops in a field. Crop sprayer 10 includes a chassis 12 and a cab 14 mounted on the chassis 12. Cab 14 houses an operator and controls for the crop sprayer 10. An engine 16 may be mounted on a forward portion of chassis 12 in front of cab 14 or may be mounted on a rearward portion of the chassis 12 behind the cab 14. The engine 16 may be commercially available from a variety of sources and may comprise, for example, a diesel engine or a gasoline powered internal combustion engine. The engine 16 provides energy to propel crop sprayer 10 and also may provide energy used to spray fluids from the crop sprayer 10.

The crop sprayer 10 further includes a supply vessel or tank 18 to contain a fluid to be sprayed on the field. The fluid may include chemicals, such as but not limited to, herbicides, pesticides, and/or fertilizers. Tank 18 may be mounted on chassis 12, typically either in front of or behind cab 14. Crop sprayer 10 may include more than one tank 18 to store different chemicals to be sprayed on the field. The contained chemicals may be dispersed by crop sprayer 10 one at a time; alternatively, different chemicals may be mixed and dispersed together.

The fluid in tank 18 is conveyed by a fluid supply system and various spray nozzles (not shown), spaced along the boom arms 20. As is known in the art, a pump (not shown) pressurizes and distributes the fluid from tank 18 and through pipes or hoses to the spray nozzles. An operator of the crop sprayer 10 may use controls (not shown) located in the cab 14 to control movement of the boom arm 20 and to turn on and to shut off the fluid flow to the plurality of spray nozzles. Spray controls are described in the following patents, assigned to AGCO Corporation of Duluth, Ga., which are hereby incorporated by reference: U.S. Pat. No. 8,028,927 entitled "Variable Rate Spray Nozzle Control"; U.S. Pat. No. 7,706,926 entitled "Adaptive Feedback Sources for Application Controllers" and U.S. Pat. No. 5,971,294 entitled "Agricultural Application Systems with Improved Spray Control."

For a boom span of about 120 feet, each of the left and right boom arms 20 is typically about 55 feet long. The width of crop sprayer 10, which is about ten feet in a typical case, is covered by a central spray bar at the rear of crop sprayer 10. For each of the left and right boom arms 20, the boom structure that is proximate the vehicle must be very strong to support the length of the boom arm 20 outward from the attachment structure. Thus, boom structures are typically quite heavy, cumbersome, and expensive.

SUMMARY

In one aspect, a crop sprayer comprises a vehicle and a spray assembly attached to the vehicle. The spray assembly comprises a support element by which the spray assembly is attached to the vehicle, a first load carrying arm selectively extendable from the support element, and a first nozzle carrying arm attached to the first load carrying arm and having at least two sections connected at a first joint. At least one of the two sections is selectively extendable from the first load carrying arm.

In another aspect, a spray assembly comprises a support element configured for attachment to a vehicle, a first load carrying arm selectively extendable from the support element, and a first nozzle carrying arm attached to the first load carrying arm and having at least two sections connected at a first joint. At least one of the two sections is selectively extendable from the first load carrying arm.

In yet another aspect, a method of deploying a spray boom system is disclosed, wherein a support element of the spray boom system is attached to a vehicle. The method comprises selectively extending a first load carrying arm from the support element and selectively extending at least one of two sections of a first nozzle carrying arm from the first load carrying arm.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

Figure 1:
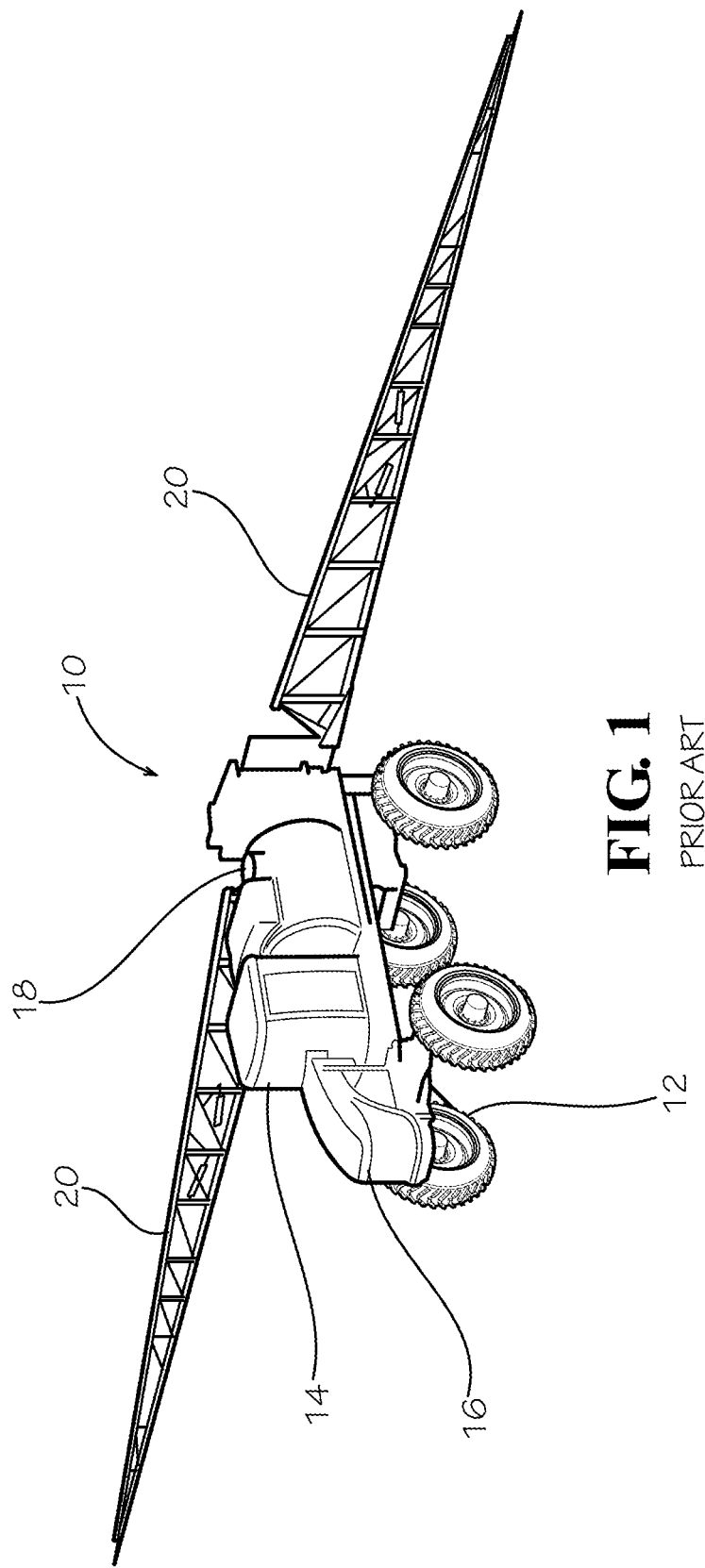
FIG. 1 is a front perspective view of a prior art crop sprayer.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

The disclosed spray boom system has a folding boom structure that separately optimizes a load carrying structure and a spray nozzle carrying structure. The folding boom structure includes left and right crane arms attached to the vehicle to support left and right nozzle arms, respectively. In an exemplary embodiment, each crane arm supports its respective nozzle arm proximate a longitudinal mid-point of the nozzle arm. The nozzle arms can be raised and lowered to achieve a desired spray height above the crops.

The folding boom structure provides for height range control and allows the boom to be folded into a relatively small package for transport and storage purposes. The different sections of the folding boom can also be repaired or replaced individually. Because each of these sections is typically smaller and lighter-weight than in current boom structures, they are more economical and easier to repair and replace.

FIGS. 2-13 illustrate a vehicle 22 having a first exemplary embodiment of a pivot hinge boom assembly 24 in various configurations. In an exemplary embodiment, pivot hinge boom assembly 24 is attached to a chassis (not shown) of vehicle 22 using conventional metal fasteners via a support element such as bracket 28 (see, e.g., FIG. 14). In an exemplary embodiment, pivot hinge boom assembly 24 includes load carrying arms such as left crane arm 30 and right crane arm 32. Pivot hinge boom assembly 24 also includes nozzle carrying arms such as left nozzle arm 34 and right nozzle arm 36.

Figure 3:
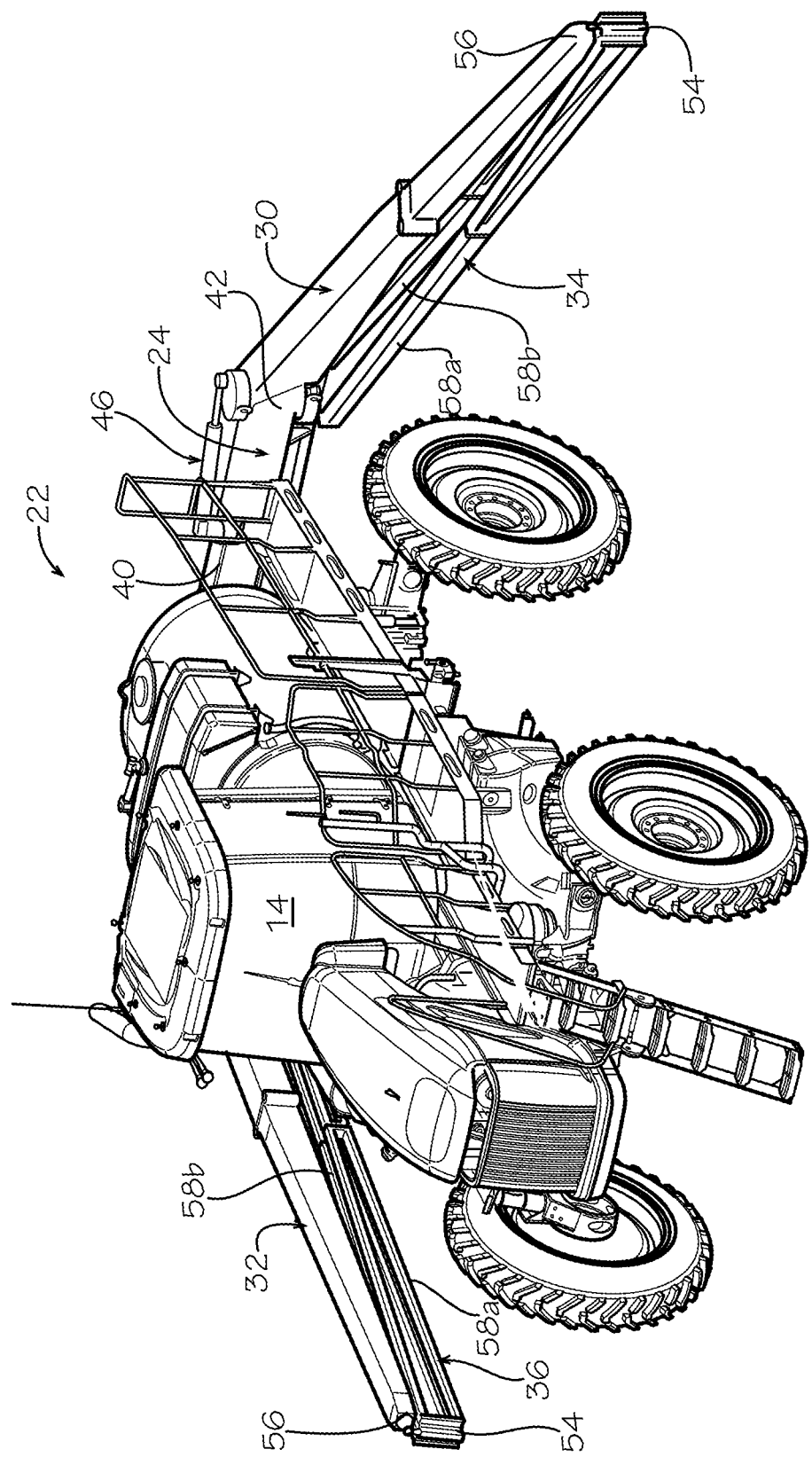
FIG. 3 is a front perspective view of the vehicle of FIG. 1 with the left (from the perspective of a driver of the vehicle) crane arm partially unfolded.
Figure 6:
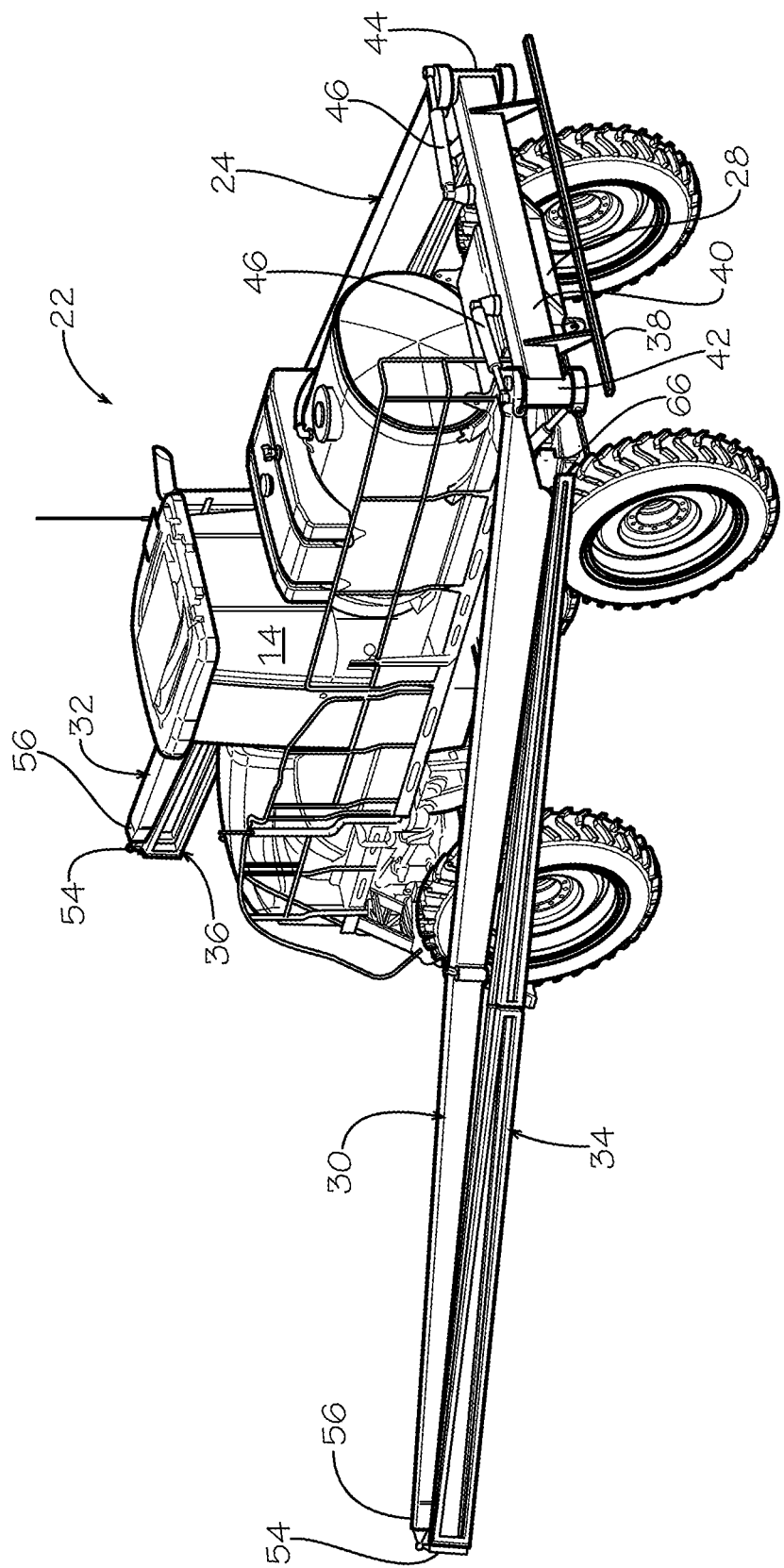
FIG. 6 is a rear perspective view of the vehicle with its folding boom in the same configuration as in FIG. 3.
Figure 14:
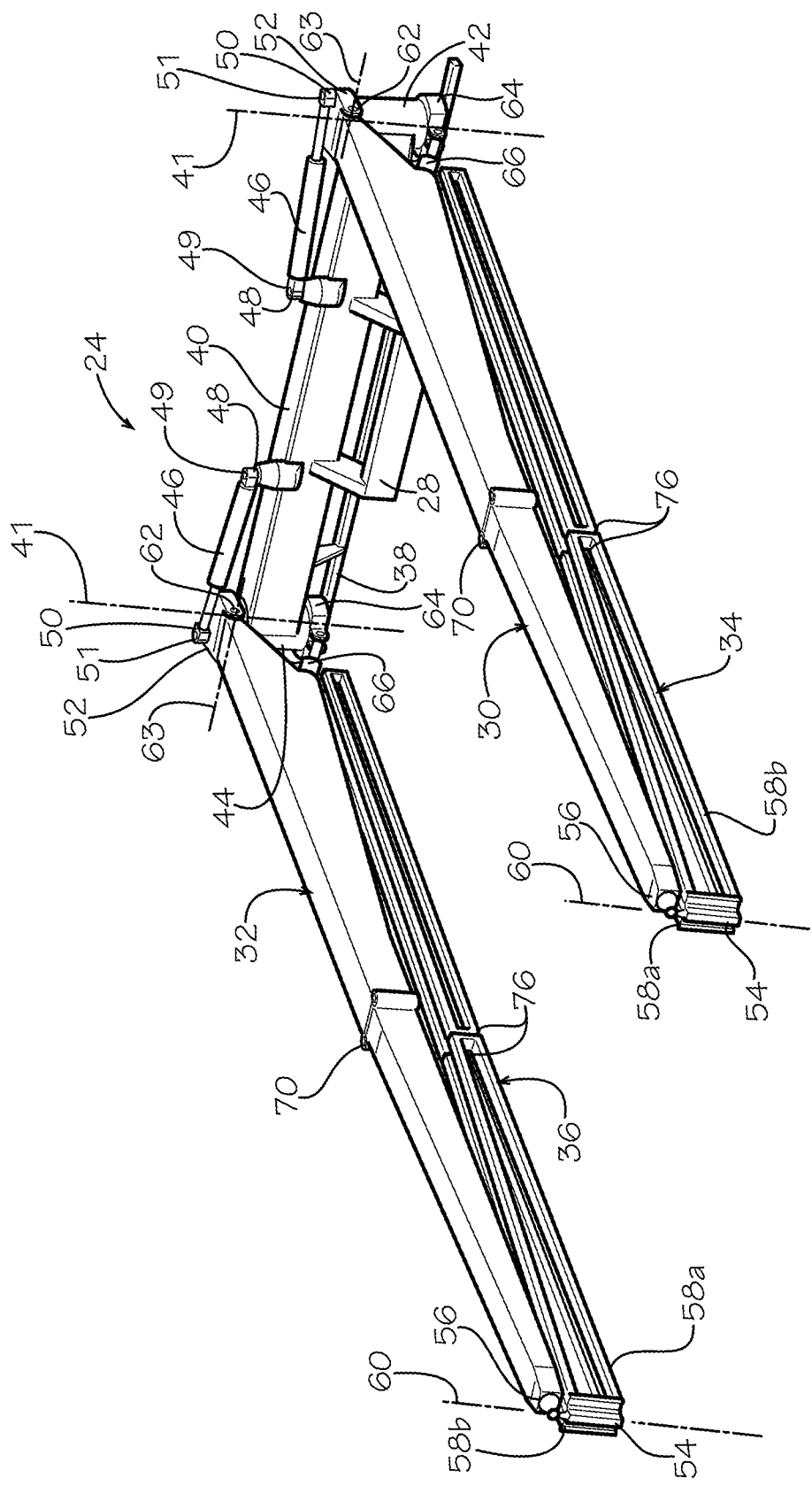
FIG. 14 is a front perspective view of the pivot hinge boom assembly removed from the vehicle of FIG. 1.

As shown in FIG. 14, left and right crane arms 30, 32 are pivotally attached to central support bar 40 at pivot hinges 42, 44. In an exemplary embodiment, hydraulic cylinders 46 control pivoting movement of crane arms 30, 32 about pivot axes 41 of pivot hinges 42, 44. As shown in FIGS. 3 and 6, in an exemplary embodiment, the pivoting motion of crane arms 30, 32 occurs in a plane substantially parallel to a ground surface under vehicle 22. Hydraulic cylinders 46 can be actuated by an operator seated in cab 14 of vehicle 22 or by a programmed or programmable controller. Hydraulic cylinders 46 are connected to vehicle 22 by hydraulic fluid hoses (not shown) in a conventional manner. First end 48 of each hydraulic cylinder 46 is pivotally connected to central support bar 40 at a fixed location, such as at pin 49. Second end 50 of each hydraulic cylinder 46 is pivotally connected to cap 52 of crane arm 30, 32 at a fixed location, such as at pin 51.

Figure 4:
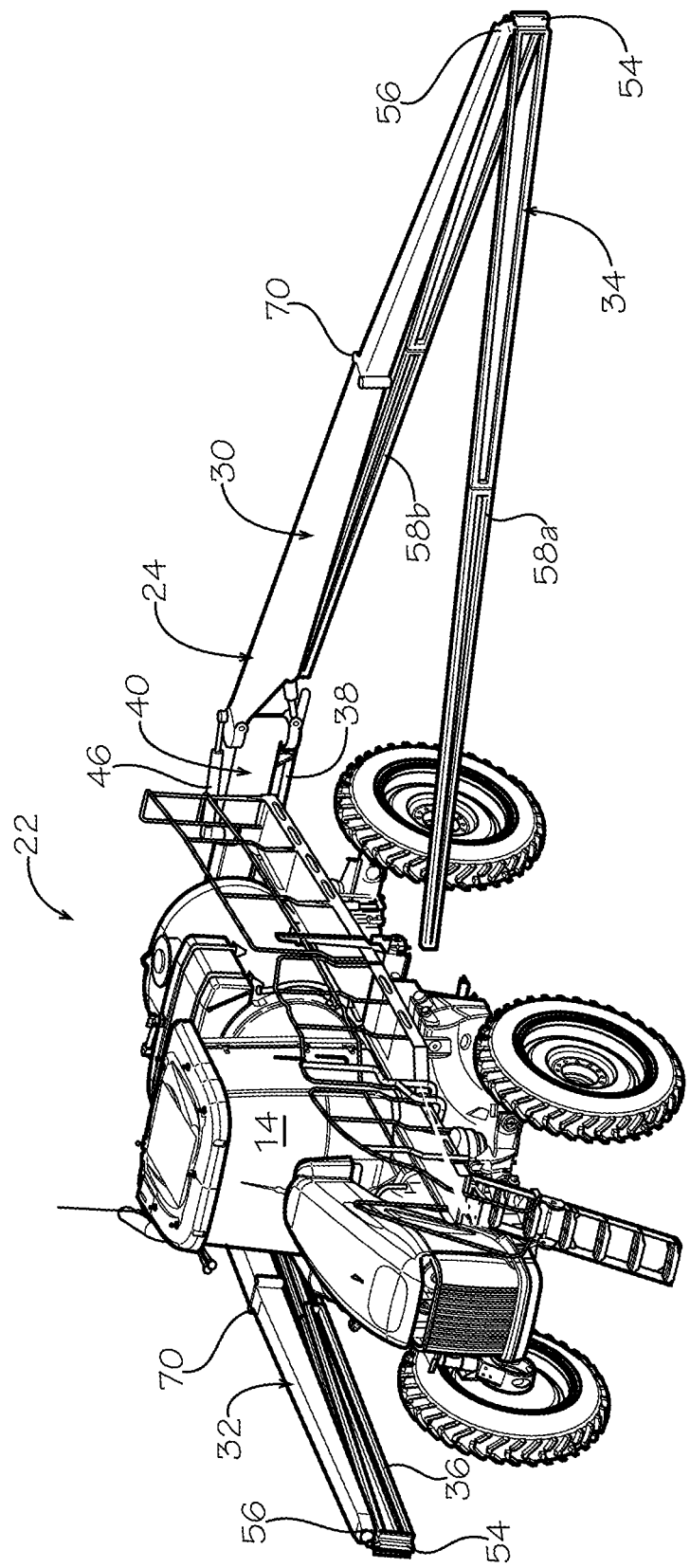
FIG. 4 is a front perspective view of the vehicle of FIG. 1 with the left crane arm unfolded and the left nozzle arm partially opened.
Figure 5:
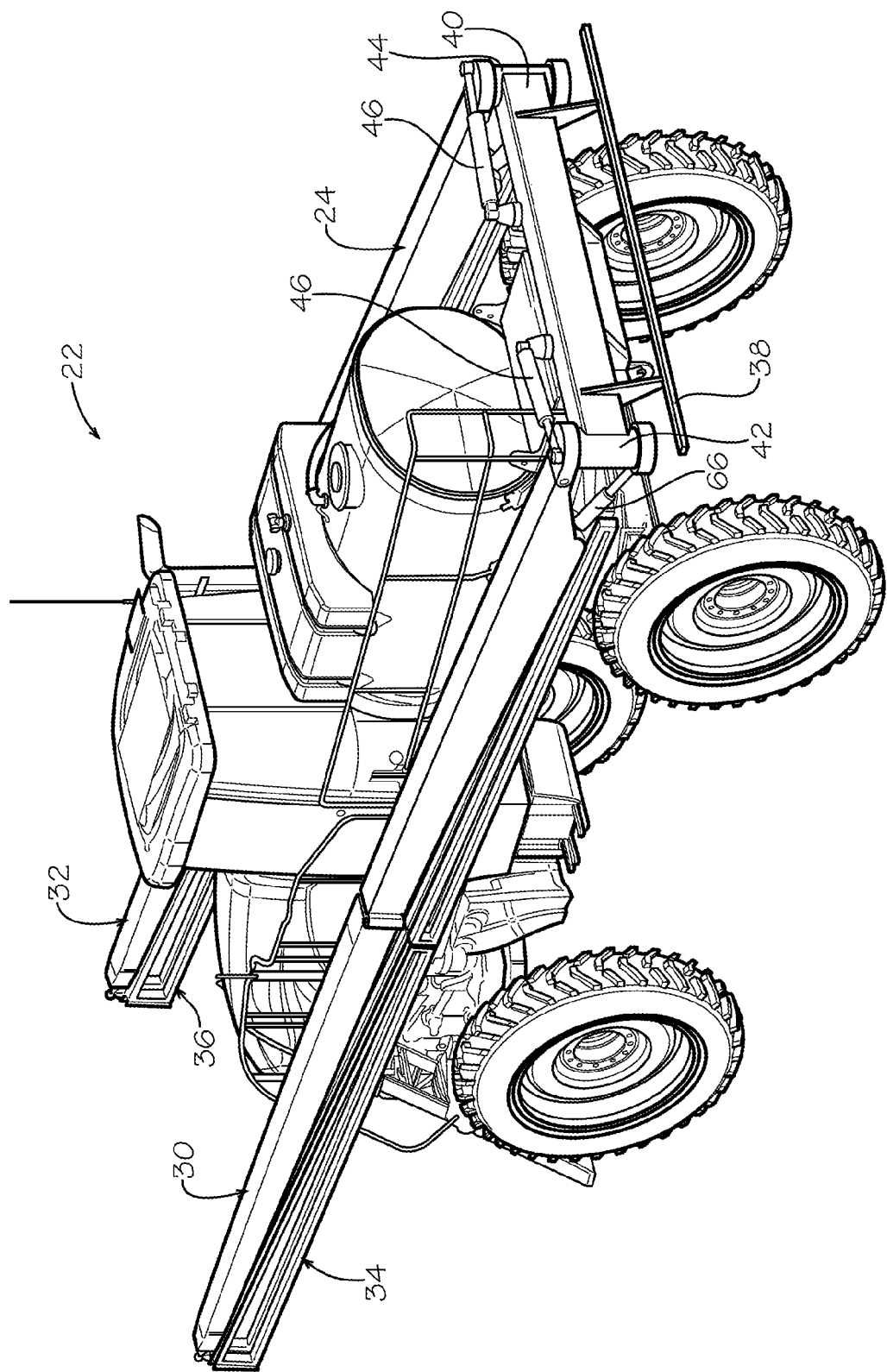
FIG. 5 is a rear perspective view of the vehicle of FIG. 1.
Figure 13:
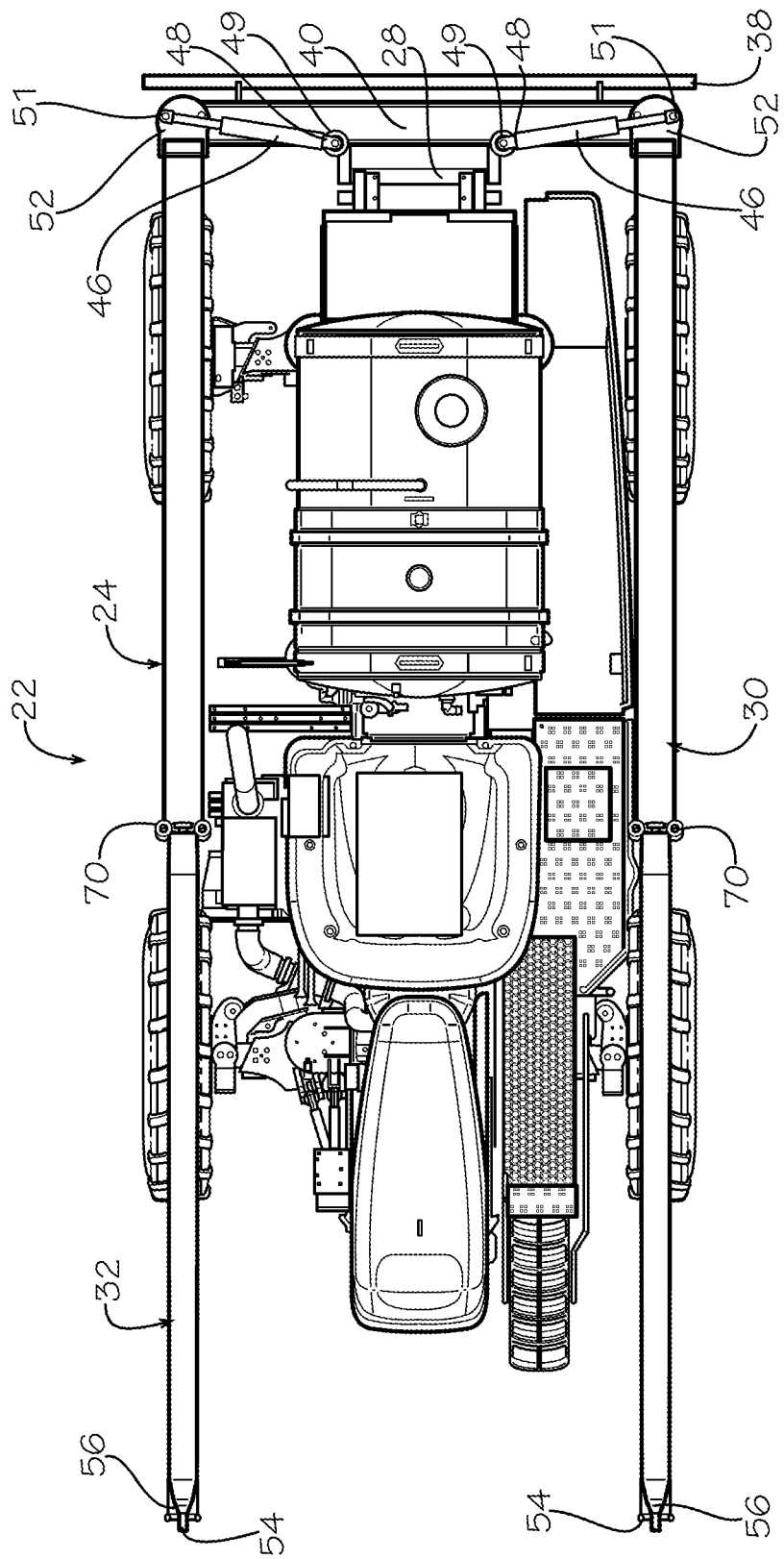
FIG. 13 is a top plan view of the vehicle of FIGS. 2 and 5.

As shown in FIG. 14, each hydraulic cylinder 46 is extended, so that crane arms 30, 32 are in a stowed configuration with respect to vehicle 22 (as shown in FIGS. 1, 5 and 13). When a hydraulic cylinder 46 is contracted, it pulls on cap 52 to rotate the attached crane arm 30, 32 about the respective pivot hinge 42, 44 (about axes 41, as seen in FIG. 14) to thereby unfold crane arm 30, 32. For example, as shown in FIGS. 3, 4, 6 and 7, left hydraulic cylinder 46 has been contracted compared to the configuration of FIGS. 2, 5, and 13, thereby resulting in left crane arm 30 opening outward from vehicle 22. While the use of hydraulic cylinders is described herein with respect to an exemplary embodiment of pivot hinge boom assembly 24, it is contemplated that other structures for controlling movement of crane arms 30, 32 can also or alternatively be used. Other suitable structures include electric motors or other actuators, for example.

Figure 7:
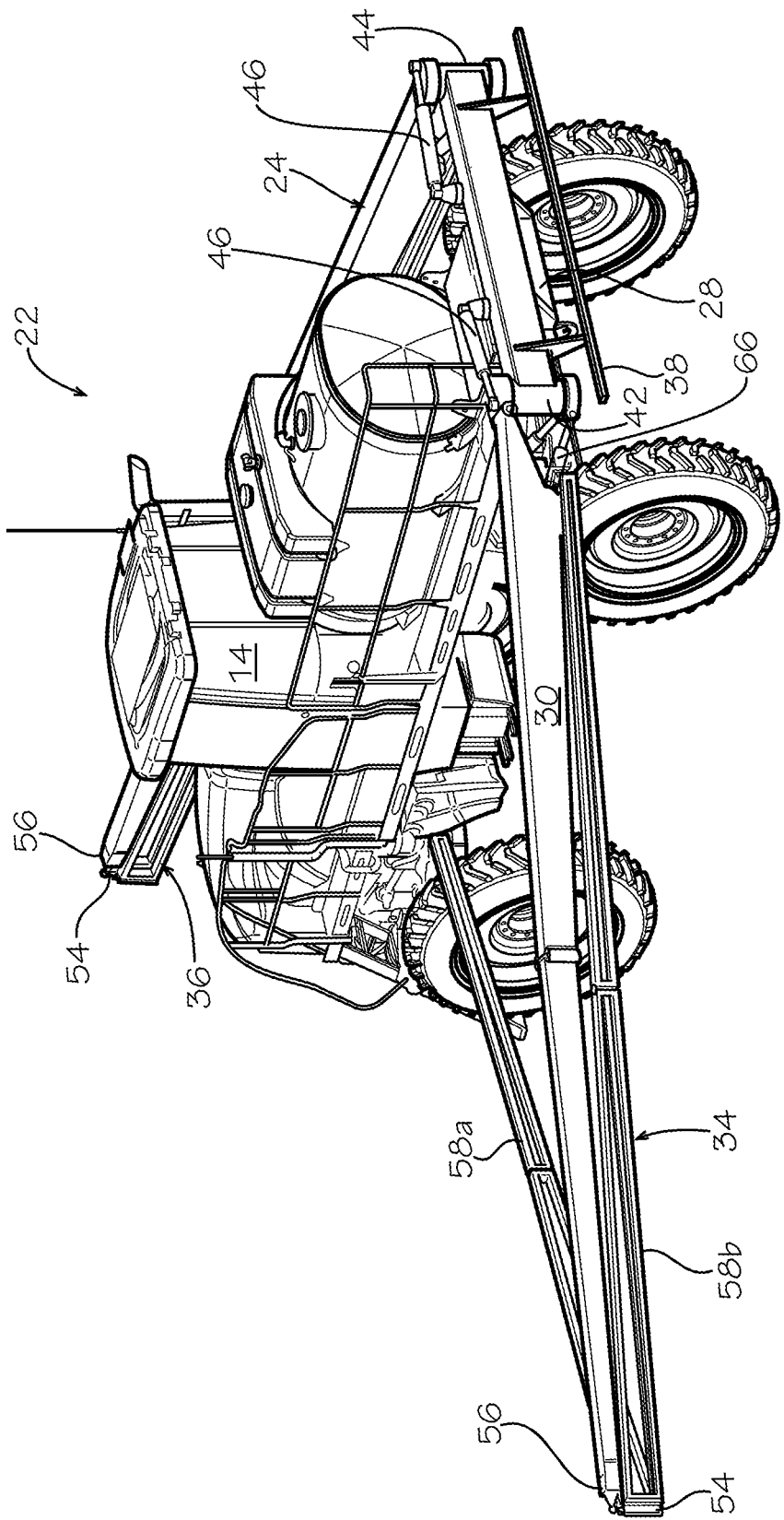
FIG. 7 is a rear perspective view of the vehicle with its folding boom in the same configuration as in FIG. 4.
Figure 8:
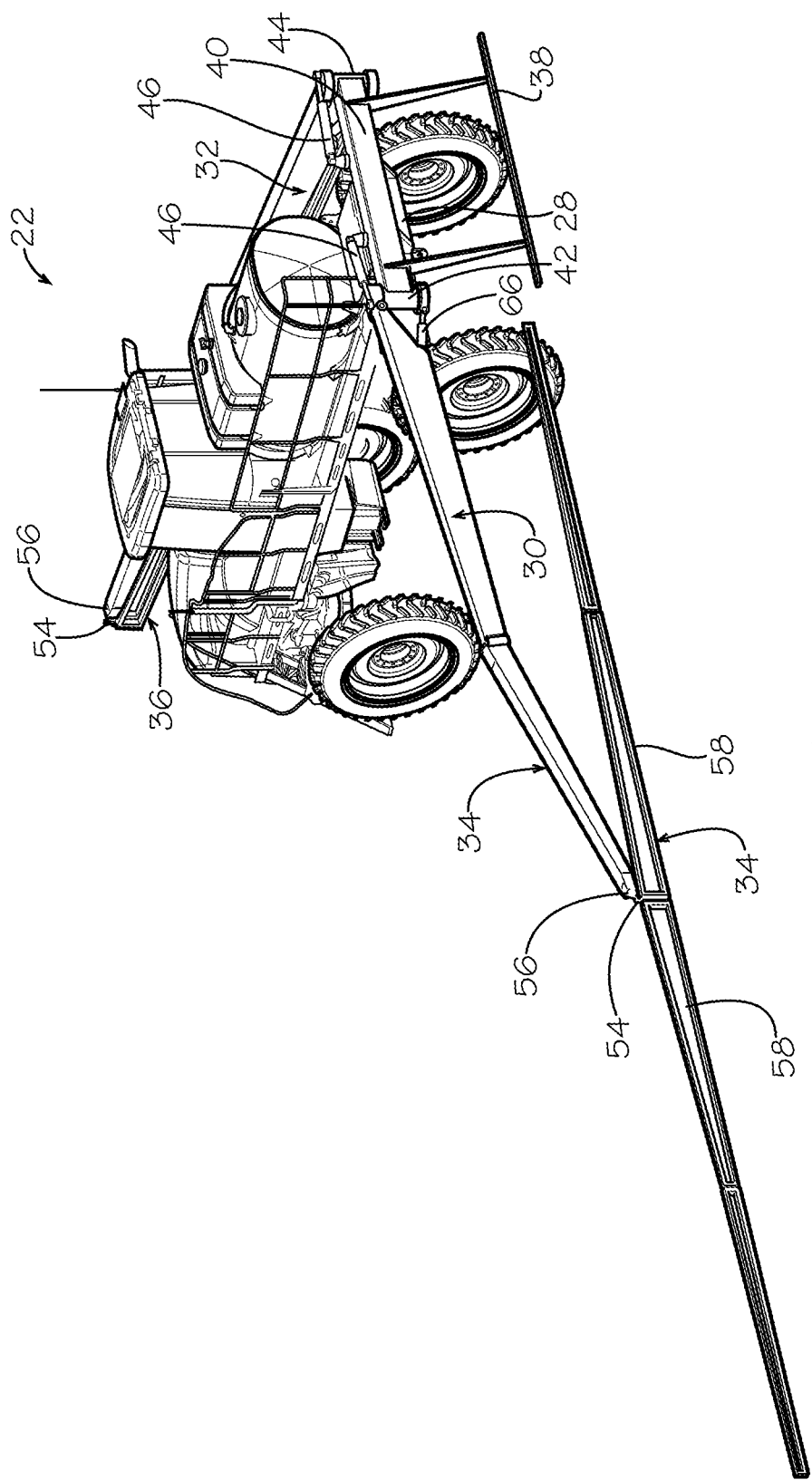
FIG. 8 is a rear perspective view of the vehicle with the left crane arm unfolded, the left nozzle arm completely opened, and the central spray bar extended downwardly.

In an exemplary embodiment, a hinge joint 54 of each nozzle arm 34, 36 is attached at an end 56 of each crane arm 30, 32. In an exemplary embodiment, hinge joint 54 joins two sections 58 of each nozzle arm 34, 36, labeled as inner section 58*a* and outer section 58*b*. One or both of sections 58 can swing about pivot axis 60 to allow nozzle arms 34, 36 to unfold. (see, e.g., FIG. 14). As shown in FIGS. 4 and 7, inner section 58*a* of left nozzle arm 34 is opening from the stowed configuration by pivoting about axis 60 of hinge joint 54. Such movement can be selectively controlled by mechanisms including hydraulic and electric actuators, for example. Such control can be input by an operator seated in cab 14 of vehicle 22 or by a programmed or programmable controller. The actuation devices are connected to vehicle 22 in a conventional manner. In an exemplary embodiment, the pivoting motion of sections 58 occurs in a plane substantially parallel to a ground surface under vehicle 22.

In an exemplary embodiment, as shown in FIG. 14, each crane arm 30, 32 is pivotally attached to cap 52 at hinge 62, thereby defining a hinge pivot axis 63, as seen in FIG. 14. Moreover, each crane arm 30, 32 is pivotally attached to base 64 with hydraulic cylinder 66. In an exemplary embodiment, hydraulic cylinders 66 control pivoting movement of crane arms 30, 32 about hinges 62. Hydraulic cylinders 66 can be selectively actuated by an operator seated in cab 14 of vehicle 22 or by a programmed or programmable controller. Hydraulic cylinders 66 are connected to vehicle 22 by hydraulic fluid hoses (not shown) in a conventional manner. As shown in FIG. 14, each hydraulic cylinder 66 is relatively contracted, so that crane arms 30, 32 are substantially horizontal or have a slight upward tilt from pivot hinges 42, 44 toward end 56. When hydraulic cylinders 66 are relatively extended, the respective crane arm 30, 32 pivots upward about hinge 62. Thus, a working height of attached nozzle arms 34, 36 can be raised. Contraction of hydraulic cylinder 66 results in lowering the working height of the respective nozzle arm 34, 36.

Figure 9:
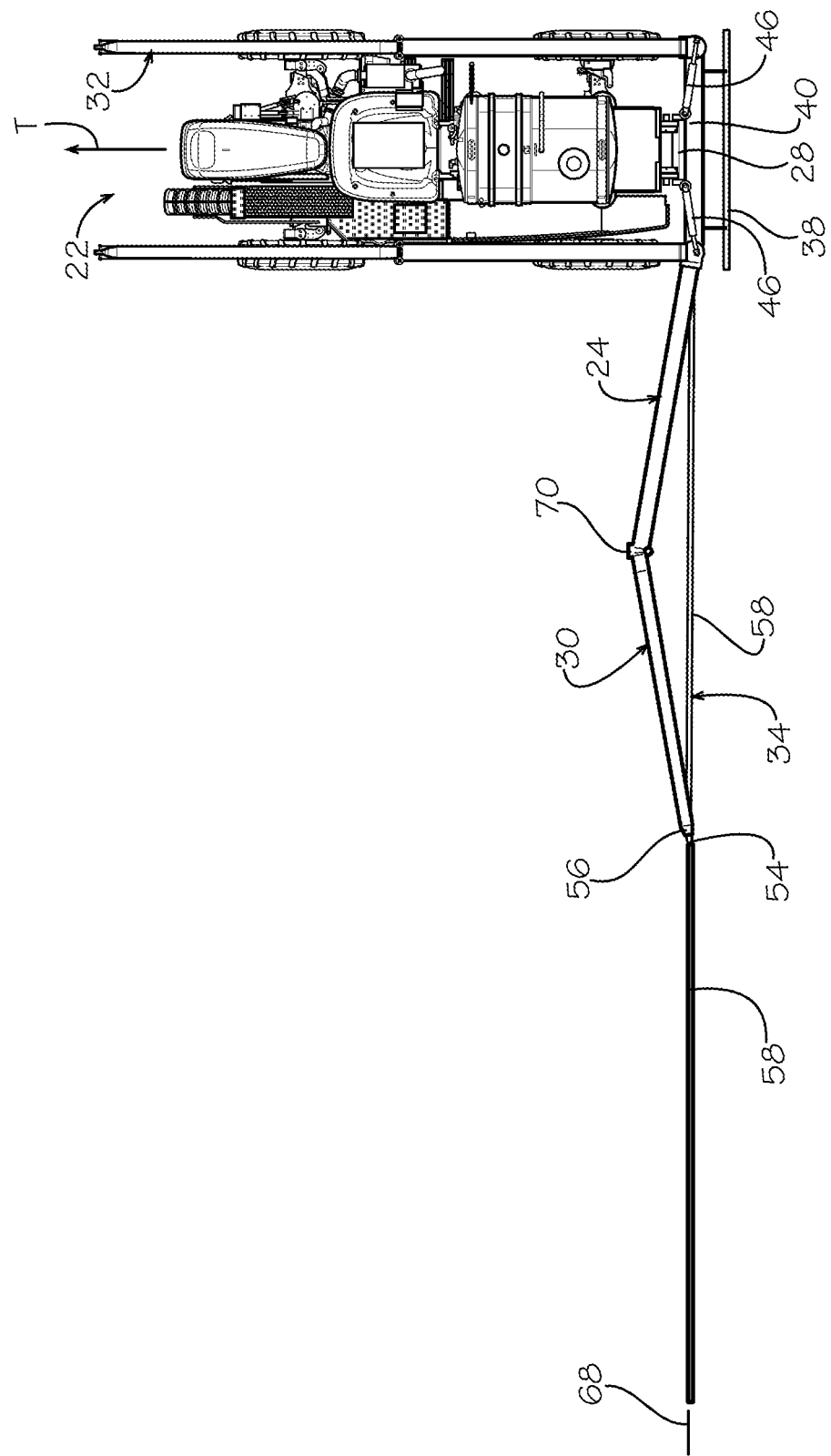
FIG. 9 is a top plan view of the vehicle with the left crane arm and left nozzle arm in the configuration of FIG. 8.
Figure 12:
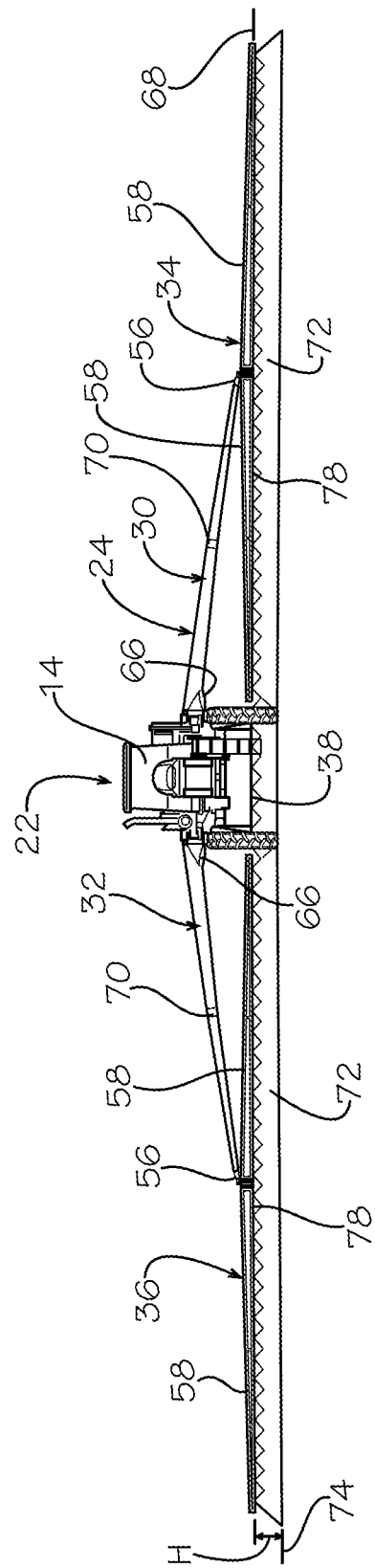
FIG. 12 is a front elevation view of the vehicle of FIGS. 10 and 11.

As shown in FIG. 9, left crane arm 30 and left nozzle arm 34 are opened and right crane arm 32 is in a stowed configuration. For ease of discussion, left crane arm 30 and left nozzle arm 34 will be described. However, it is to be understood that the description also applies to right crane arm 32 and right nozzle arm 36. In an exemplary embodiment, in preparation for spraying, the sections 58 of left nozzle arm 34 are opened so that left nozzle arm 34 is aligned along axis 68 generally perpendicular to the direction of travel T. In the illustrated embodiment, left crane arm 30 includes a bend at joint 70, which is positioned proximate a longitudinal mid-point of left crane arm 30. Referring also to FIGS. 12 and 14, it is evident that extending cylinder 66 to raise left crane arms 30, 32 will result in left nozzle arm 34 moving along axis 68 in a direction farther from vehicle 22. To maintain a desired spacing between nozzle arms 34, 36 and vehicle 22, the bend at joint 70 can be increased (i.e., crane arms 30, 32 can be more bent) to move nozzle arms 34, 36 along axis 68 in a direction closer to vehicle 22.

In an exemplary embodiment, in preparation for spraying, the sections 58 of right nozzle arm 32 are opened so that right nozzle arm 36 is also aligned along axis 68 generally perpendicular to the direction of travel T. Generally, however, spray bar 38 trails left and right nozzle arms 34, 36 but is positioned at the same height H as left and right nozzle arms 34, 36. (see, e.g., FIG. 12).

Figure 10:
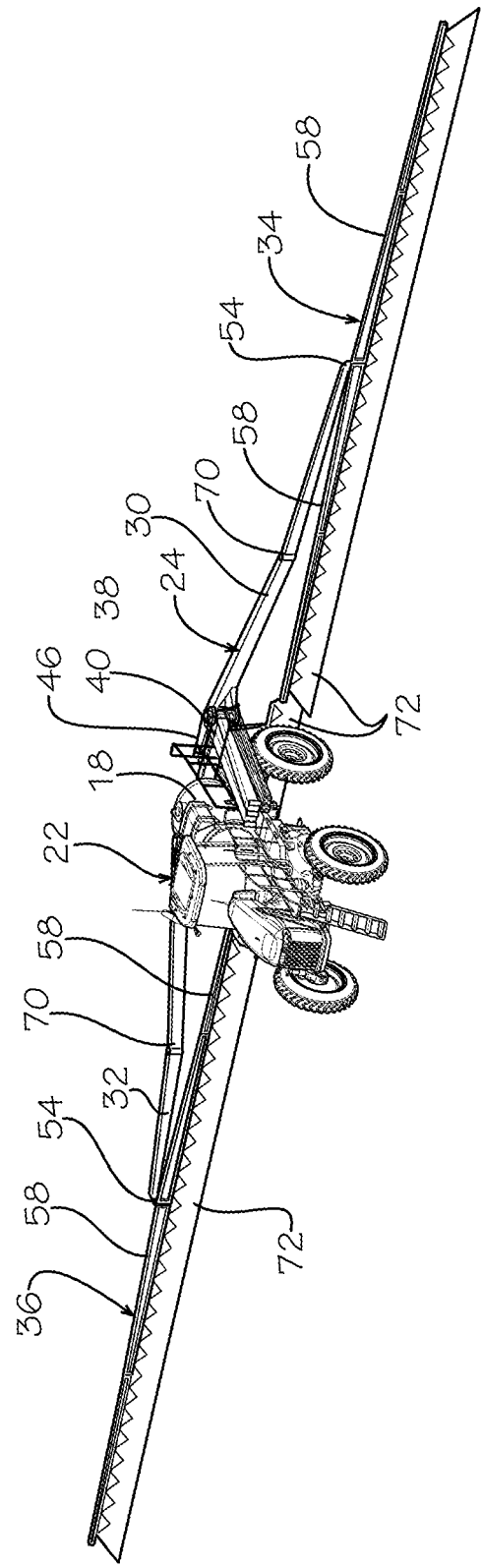
FIG. 10 is a front perspective view of the vehicle during a spraying operation with both the left and right crane arms unfolded and left and right nozzle arms completely opened.
Figure 11:
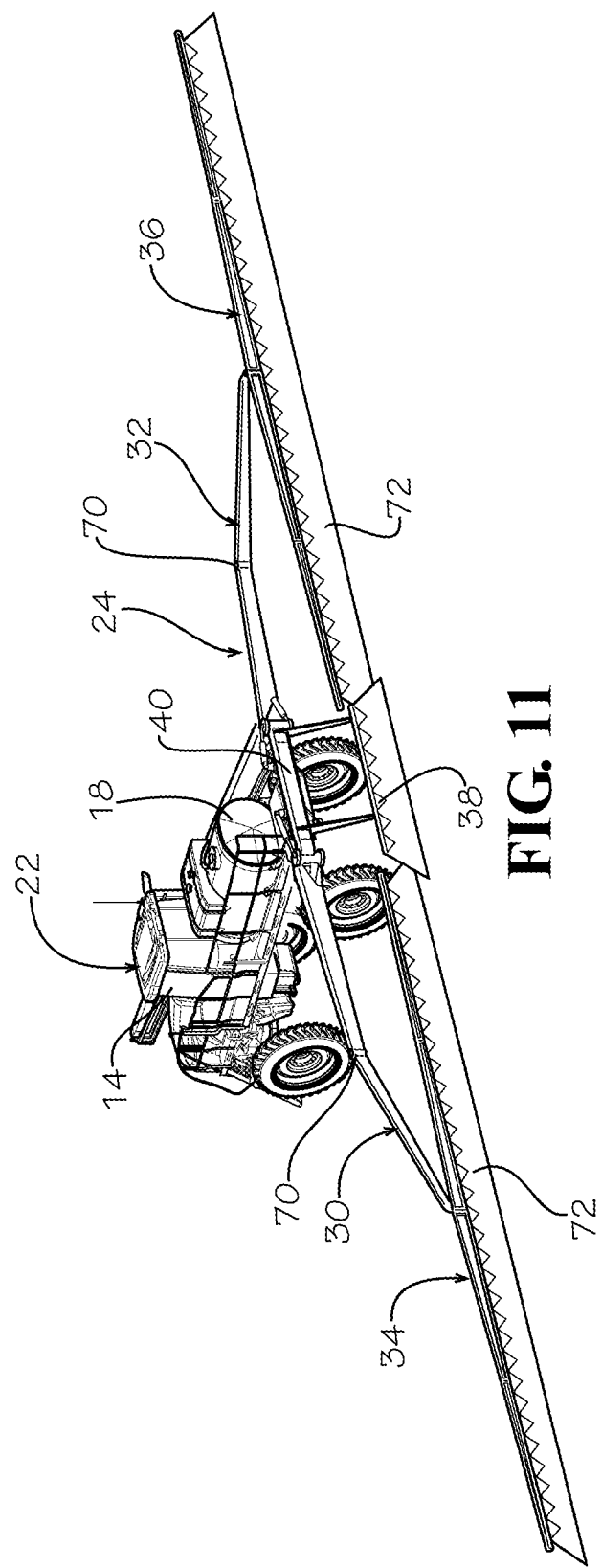
FIG. 11 is a rear perspective view of the vehicle of FIG. 10.

While it is possible to use vehicle 22 to spray only out of one nozzle arm, such as left nozzle arm 34, it is more typical to fully deploy left and right crane arms 30, 32 and left and right nozzle arms 34, 36. FIGS. 10 and 11 show front and rear perspective views, respectively, of vehicle 22 with pivot hinge boom assembly 24 fully deployed for a spraying operation. As shown, fluid 72 is deployed from spray nozzles (not shown) positioned on left nozzle arm 34, right nozzle arm 36 and central spray bar 38. Fluid is supplied from tank 18 through an assembly of fluid hoses to an array of spaced spray nozzles (not shown) positioned on nozzle arms 34, 36. The spray nozzles may be attached to nozzle arms 34, 36 in a manner similar to the attachment of spray nozzles to a conventional boom arm. With the disclosed pivot hinge boom assembly 24, the load carrying members (left and right crane arms 30, 32) are separated from the spray nozzle carrying members (left and right nozzle arms 34, 36). This is in sharp contrast to the prior art boom 20 of FIG. 1, in which the boom arm 20 must transfer the entire weight load of the boom arm 20 to the chassis of crop sprayer 10 as well as serve as the structure on which the spray nozzles are positioned.

With the disclosed design of pivot hinge boom assembly 24, the load-carrying and spray-positioning functions are served by separate structures; thus, each structure can be optimized for its particular task. For example, the left and right crane arms 30, 32 are optimized for strength, while the left and right nozzle arms 34, 36 are optimized for spray distribution. In an exemplary embodiment, each of left and right crane arms 30 has a tubular structure with a substantially square cross-section. In an exemplary embodiment, each of left and right nozzle arms 34, 36 consists of elongated frames. Because of the simple design of crane arms 30, 32 and nozzle arms 34, 36 compared to the truss structure of boom arm 20 of the prior art, the components of pivot hinge boom assembly 24 may be more easily constructed of less common materials, such as carbon fiber, as well as more conventional materials such as steel and aluminum. Moreover, the simple designs of left and right nozzle arms 34, 36 that are illustrated and described allow for decreased material usage, compared to the prior art boom arm 20, thereby allowing for the use of more expensive materials for enhanced performance (including features such as lighter weight and corrosion resistance, for example).

Moreover, for crop sprayer vehicles 10 and 22 having the same spray coverage (i.e., overall span of boom arms or nozzle arms) each crane arm 30, 32 has a length that is approximately only half the length of boom arm 20. The shorter crane arm 30, 32 length may result in less stress overall in the connection of the boom assembly to the vehicle chassis.

FIG. 12 shows a front elevation view of vehicle 22 with pivot hinge boom assembly 24 fully deployed for a spraying operation. In an exemplary embodiment, fluid 72 is distributed from spray nozzles on left nozzle arm 34, right nozzle arm 36 and central spray bar 38 at a consistent height H above ground surface 74. In an exemplary embodiment, each nozzle arm 34, 36 comprises an elongated frame, wherein a portion (such as a lower bar 78) of the nozzle arm 34, 36 is aligned substantially parallel to ground surface 74. As discussed earlier, the working height of each of left and right nozzle arms 34, 36 (e.g., a distance between lower bar 78 and ground surface 74) is adjustable by changing an extension of hydraulic cylinder 66 (shown in FIG. 14). This working height can be matched by extending or retracting central spray bar 38 from central support bar 40. (compare FIGS. 7 and 8). The extension and refraction of central spray bar 38 can be accomplished by hydraulic cylinders, electric actuators, and other devices in a conventional manner. In another embodiment, left and right nozzle arms 34, 36 may be positioned to cover the central area behind vehicle 22, thereby eliminating the need for central spray bar 38.

Figure 2:
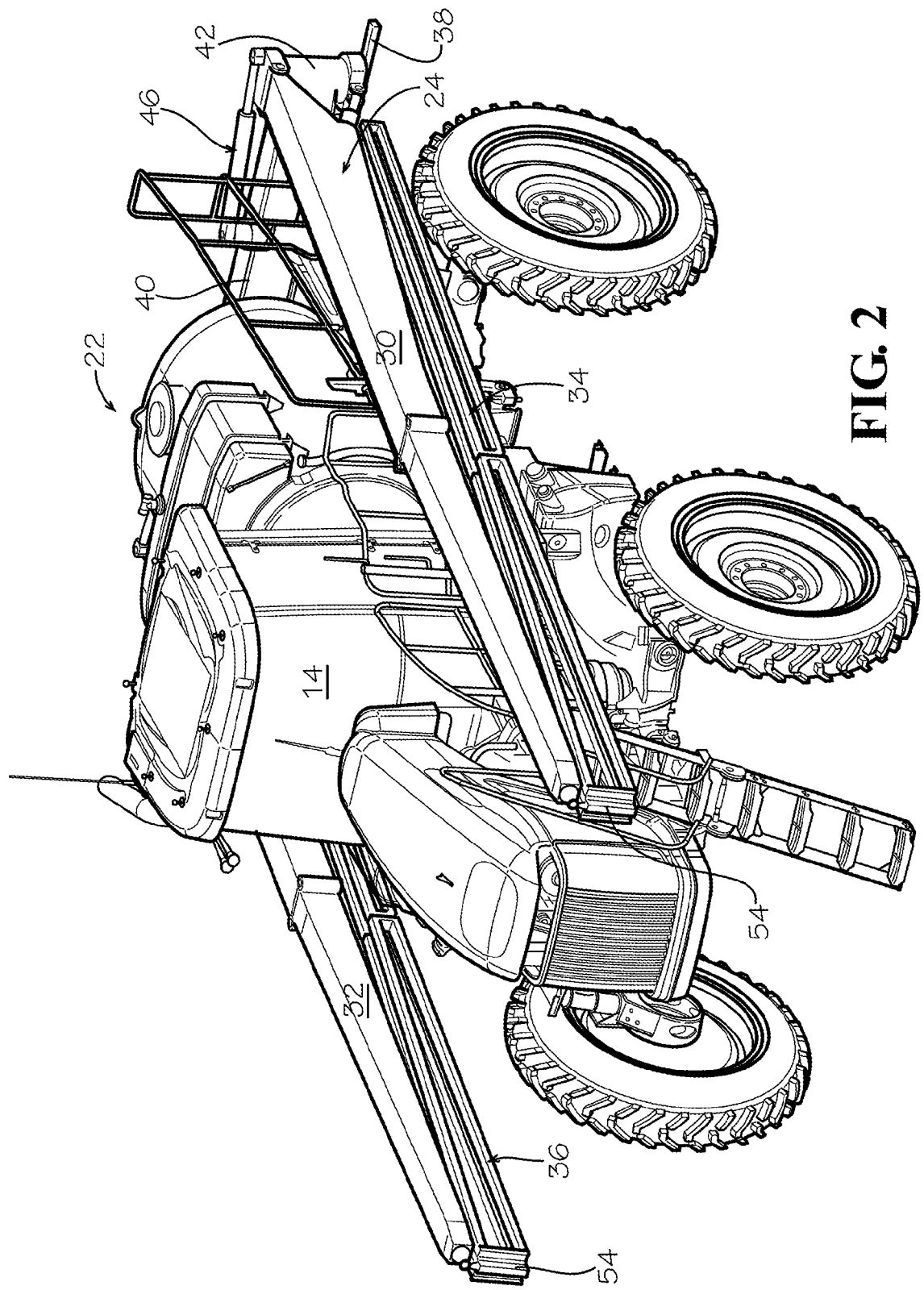
FIG. 2 is a front perspective view of a crop sprayer vehicle with an exemplary folding boom structure of the present disclosure in a stowed configuration.

As shown in FIGS. 2, 5 and 13, pivot hinge boom assembly 24 in a first stowed configuration is very compact for ease of transport and storage. Moreover, while is particular sequence of opening the closing the components of pivot hinge boom assembly 24 is shown and described, it is contemplated that other configurations are possible. In an exemplary embodiment, each of joints 54, 70 and 76 is bi-directional. For example, in comparing FIGS. 3 and 4, the illustrated embodiment shows the inner section 58*a* of left nozzle arm 34 opening from left crane arm 30. In another case, one may desire to leave inner section 58*a* of left nozzle arm 34 proximate crane arm 30 and instead open the outer section 58*b* of left nozzle arm 34 away from vehicle 22. In some respects, the latter implementation may even be preferable, as there is a decreased risk of a nozzle arm section 58 striking vehicle 22.

Figure 15:
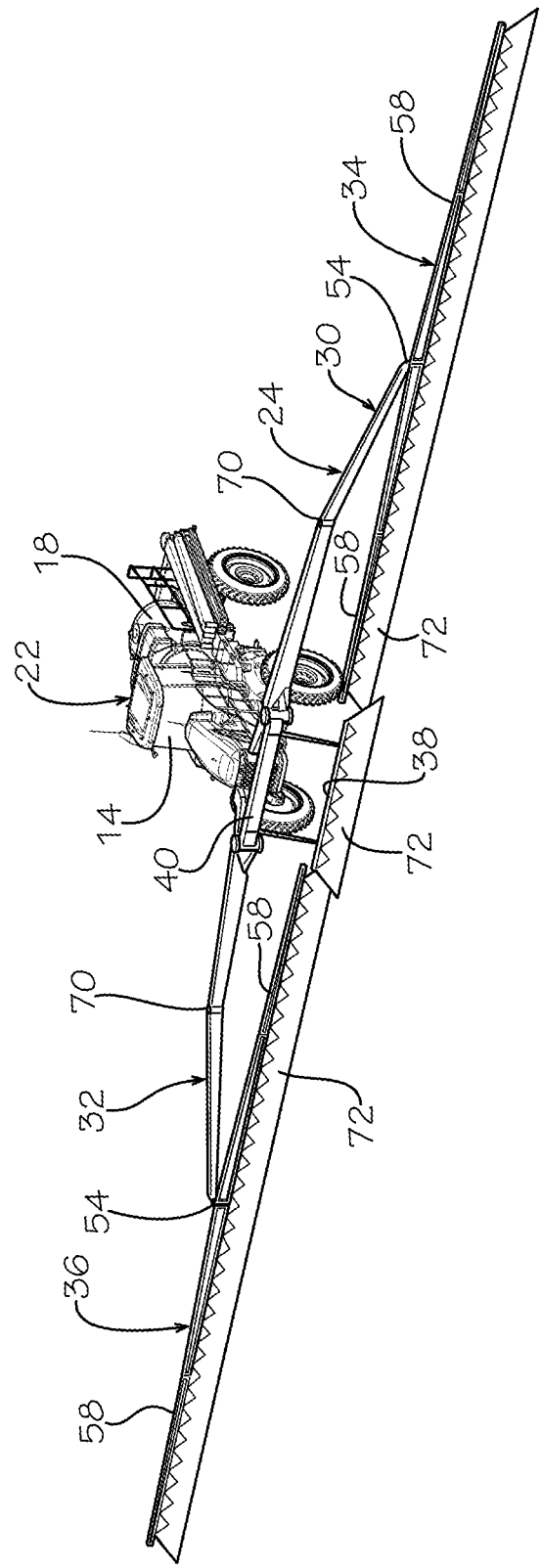
FIG. 15 is a front perspective view of a vehicle during a spraying operation with both the left and right crane arms unfolded and left and right nozzle arms completely opened, wherein the pivot hinge boom assembly is mounted at the front of the vehicle.
Figure 16:
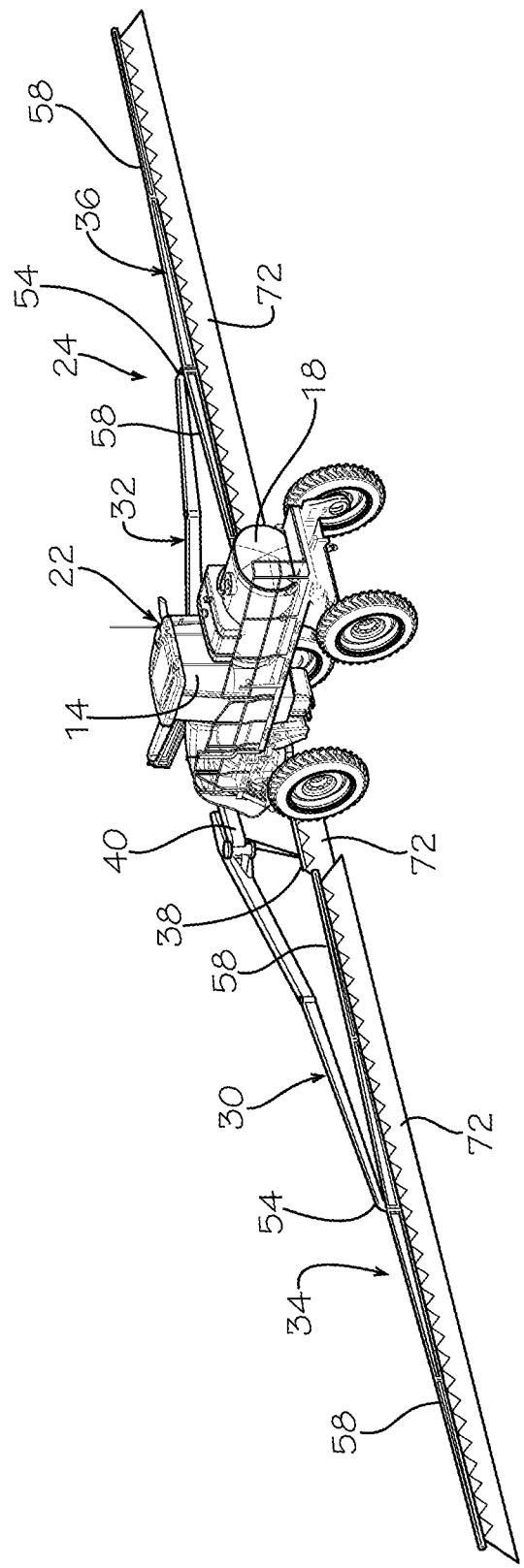
FIG. 16 is a rear perspective view of the vehicle of FIG. 15.

Pivot hinge boom assembly 24 presents flexible mounting options. For example, FIGS. 15 and 16 show pivot hinge boom assembly 24 mounted on a front of vehicle 22. Moreover, while the illustrated embodiments show bracket 28 of pivot hinge boom assembly 24 mounted to a central part of a chassis of vehicle 22 (either at the rear of vehicle 22, as shown in FIGS. 2-13, or at the front of vehicle 22, as shown in FIGS. 15 and 16), it is also contemplated that the design may be modified for off-center mounting. Moreover, pivot hinge boom assembly 24 could be modified for mounting between cab 14 and tank 18 or at another location on vehicle 22.

Figure 17:
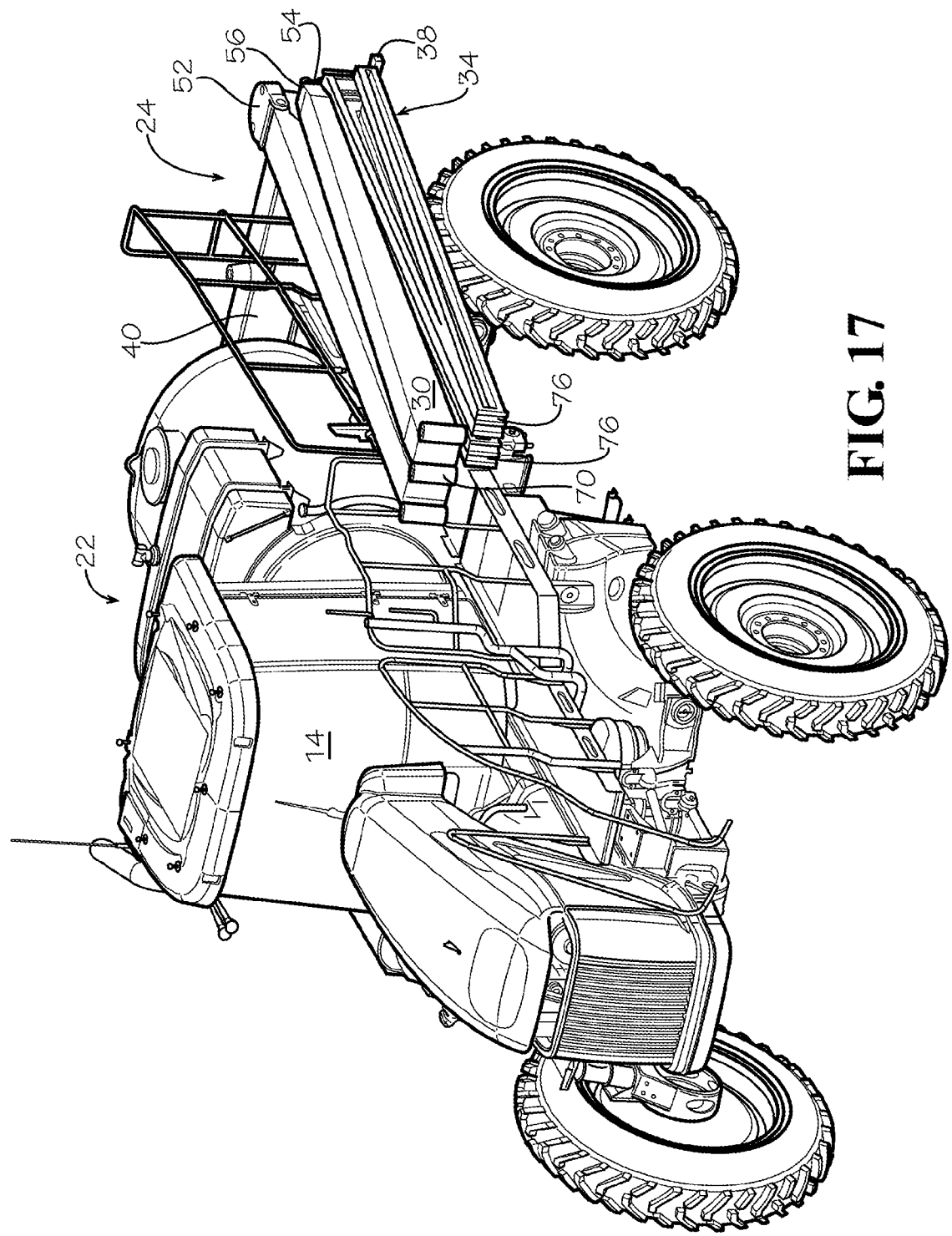
FIG. 17 is a front perspective view of a crop sprayer vehicle with an exemplary folding boom structure of the present disclosure in a second exemplary stowed configuration.
Figure 18:
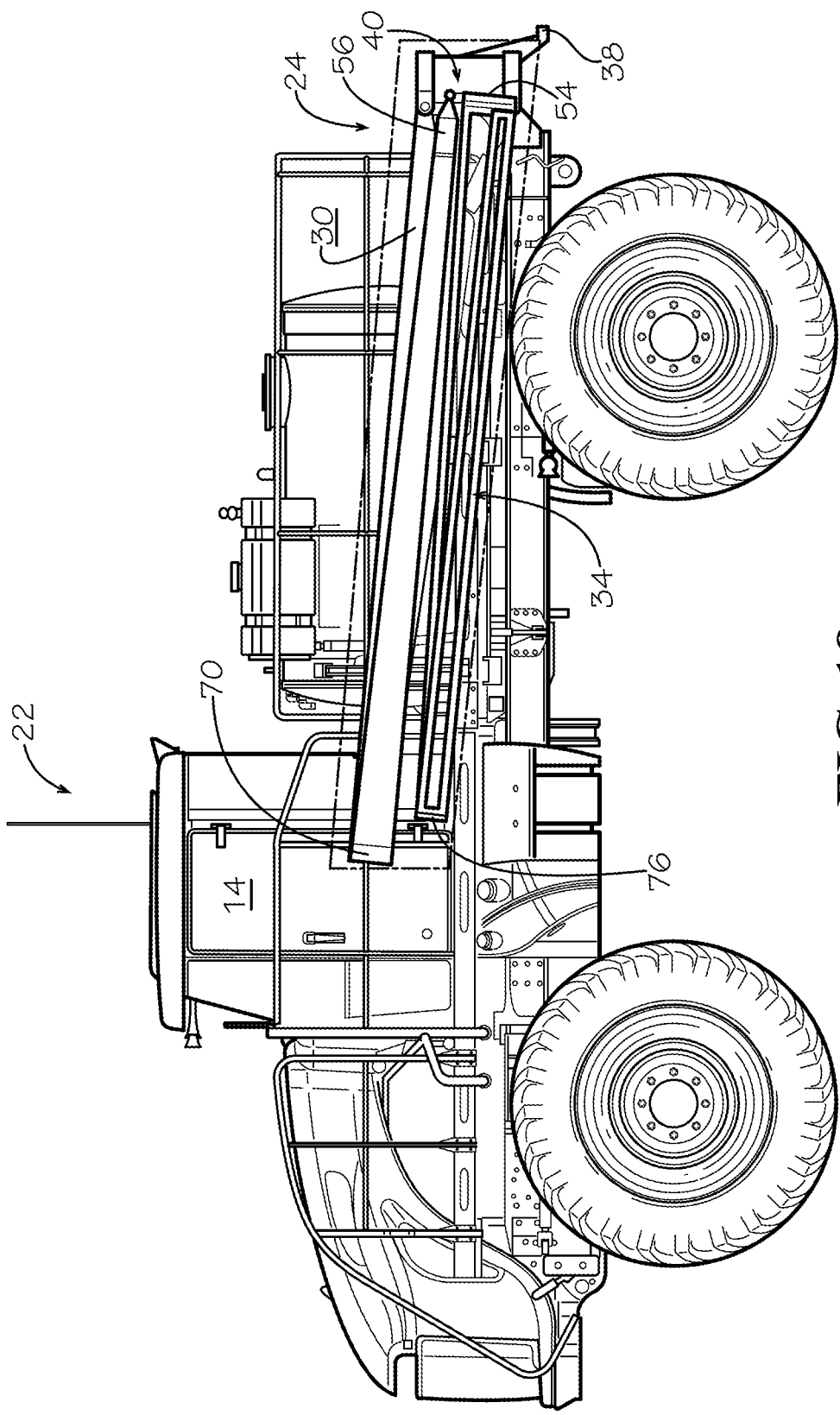
FIG. 18 is a side elevation view of the vehicle of FIG. 17.

FIGS. 17 and 18 show another stow configuration, wherein each crane arm 30, 32 is additionally folded at joint 70 and each nozzle arm 34, 36 is additionally folded at joints 76. Hydraulic cylinders 46 are not shown for clarity. As shown in FIG. 14, joint 76 is positioned proximate a longitudinal mid-point of each section 58; thus, each nozzle arm 34, 36 may be divided lengthwise into quarters. While a symmetrical design is shown and described (for example, each nozzle arm 34, 36 is divided into identical mirror-image sections 58*a*, 58*b*), it is contemplated that other forms of the described components may also be used. For example, an additional nozzle arm section may be added to the nozzle arm, such as an additional tip section to increase the span of the nozzle arm, without changing the location where the nozzle arm attaches to its respective crane arm.

In an exemplary embodiment, each of the separate sections of crane arm 30, 32 and nozzle arm 34, 36 that are connected with joints 54, 70, 76 may be individually replaced or repaired if needed. The modular nature of the disclosed pivot hinge boom assembly 24 thus allows for ease and low cost in maintenance. The stow configuration of FIGS. 17 and 18 is more compact lengthwise than that shown in FIGS. 2, 5 and 13 but is slightly wider. Other stow configurations are also possible with the joints of the disclosed pivot hinge boom assembly 24.

Figure 19:
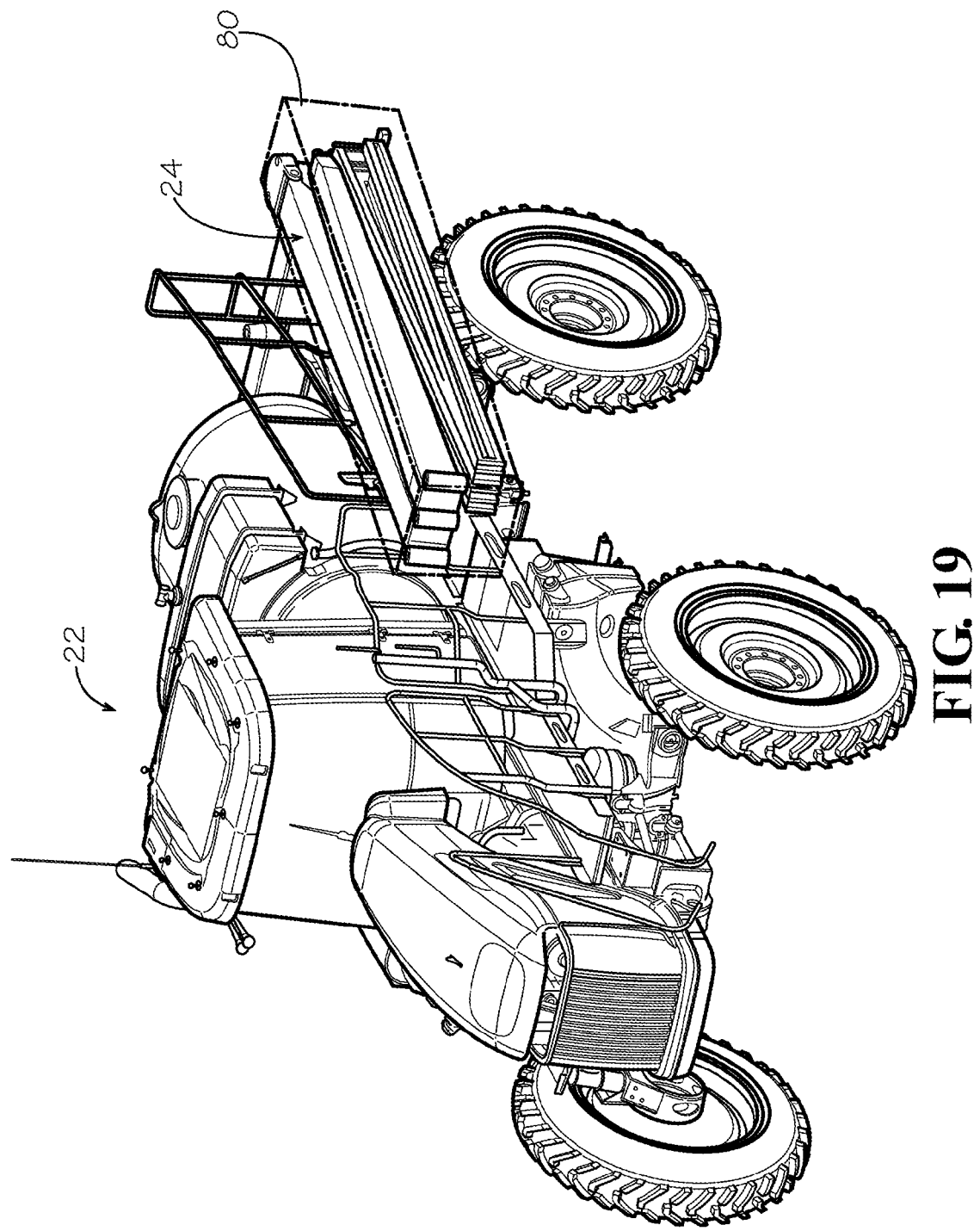
FIG. 19 is similar to FIG. 17 but shows a protective shroud covering the retracted pivot hinge boom assembly.
Figure 20:
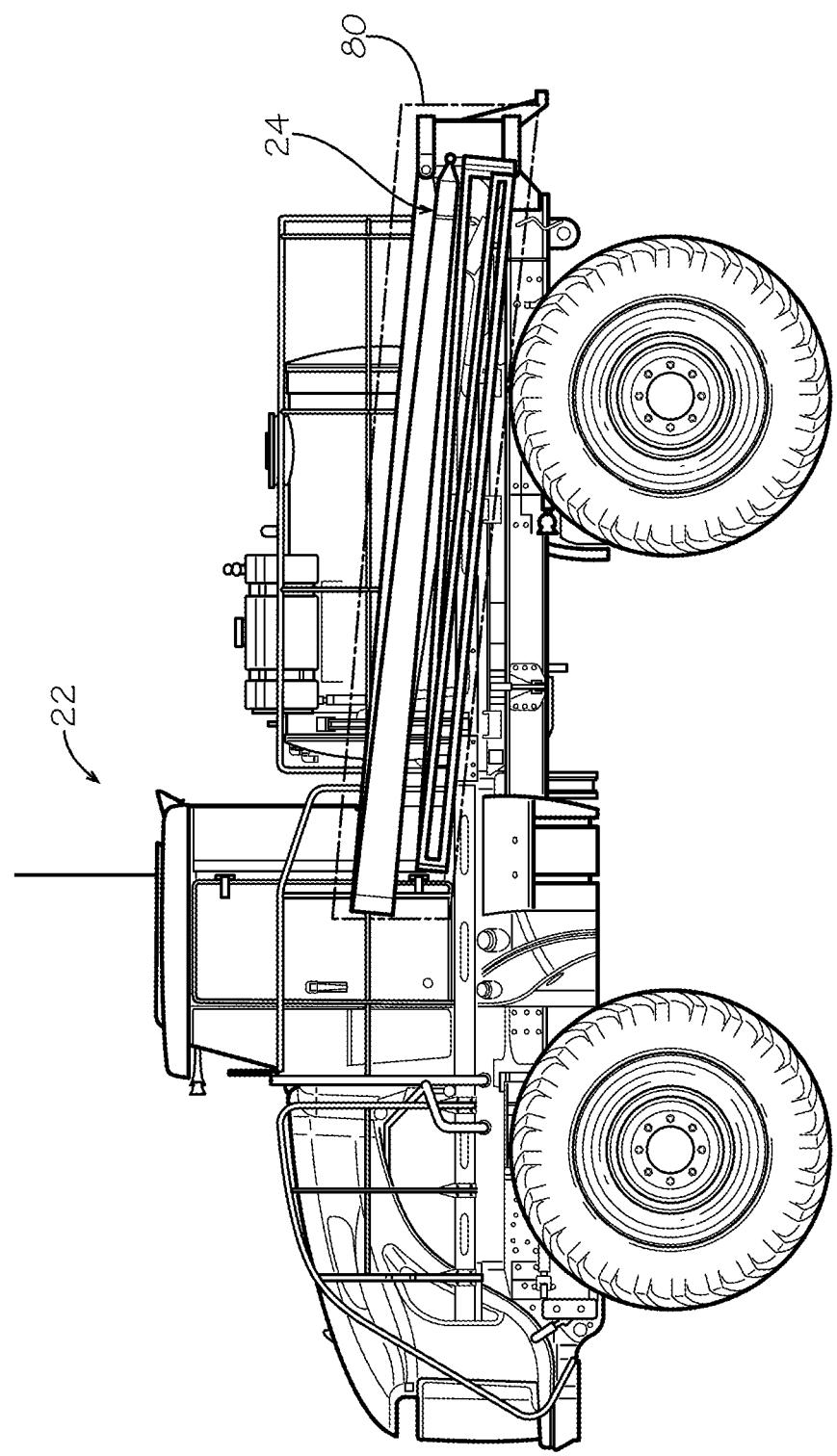
FIG. 20 is similar to FIG. 18 but shows the shroud of FIG. 19.

As shown in FIGS. 19 and 20, in some embodiments the stowed configuration makes it feasible to retract pivot hinge boom assembly 24 into protective shroud 80, shown in phantom lines. Shroud 80 covers the stowed pivot hinge boom assembly 24 to protect it from the elements and debris during transport and storage. Shroud 80 may be made of various materials, including plastic, textiles, and metal. Shroud 80 may also be made in various configurations, including a box-like form with automatically opening panels, for example, to permit extension and retraction of pivot hinge boom assembly 24.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. A crop sprayer vehicle comprising a sprayer assembly attached to the vehicle, the sprayer assembly comprising:
   a support element by which the sprayer assembly is attached to the vehicle;
   first and second load carrying arms on opposing sides of the vehicle, each load carrying arm having a proximal end mounted on the support element and selectively extendable from the support element between a stowed configuration in which the load carrying arm is generally aligned adjacent the vehicle and a spraying configuration in which the load carrying arm extends outward from the vehicle such that the load carrying arm is generally perpendicular to a direction of travel; and
   first and second nozzle carrying arms attached to the first and second load carrying arms respectively, each nozzle carrying arm attached to a distal end of its load carrying arm, wherein each nozzle carrying arm has at least two sections connected at a first joint such that a first of the at least two sections extends from the first joint toward a first end of the nozzle arm and a second of the at least two sections extends from the first joint toward a second end of the nozzle arm such that nozzle carrying arm is attached to the distal end of the load carrying arm intermediate the first end and the second end of the nozzle arm, and wherein when the load carrying arm is in the spraying configuration, the first section is selectively extendable such that the first end extends further away from the vehicle than the distal end of the load carrying arm, and the second section is selectively extendable such that the second end extends closer toward the vehicle than the distal end of the load carrying arm.

2. The crop sprayer of claim 1 wherein the support element is attached to a chassis of the vehicle.

3. The crop sprayer of claim 1 wherein the first nozzle carrying arm is attached to the first load carrying arm proximate the first joint.

4. The crop sprayer of claim 1 wherein the first load carrying arm is extendable from a left side of the vehicle and wherein the second load carrying arm is extendable from a right side of the vehicle.

5. The crop sprayer of claim 1 further comprising a second joint positioned proximate a longitudinal mid-point of the first load carrying arm.

6. The crop sprayer of claim 5 further comprising a bend at the second joint.

7. The crop sprayer of claim 1 further comprising a second joint positioned proximate a longitudinal mid-point of at least one of the two sections.

8. The crop sprayer of claim 1 further comprising a hydraulic cylinder attached to the support element and attached to the first load carrying arm, wherein changing a length of the hydraulic cylinder causes the first load carrying arm to extend from the support element.

9. The crop sprayer of claim 1 wherein extension of the first load carrying arm from the support element comprises movement of the first load carrying arm in a pivoting motion, the motion being in a plane substantially parallel to a ground surface under the vehicle.

10. The crop sprayer of claim 1 wherein extension of at least one of the two sections of the nozzle arm from the load carrying arm comprises movement of the at least one of the two sections in a pivoting motion, the motion being in a plane substantially parallel to a ground surface under the vehicle.

11. The crop sprayer of claim 1 wherein the first nozzle carrying arm comprises an elongated frame, wherein a portion of the frame is movable for alignment substantially parallel to a ground surface under the vehicle.

12. The crop sprayer of claim 11 wherein a distance between the portion and the ground surface is adjustable.

13. The crop sprayer of claim 1 wherein the support element is attached proximate a front of the vehicle or wherein the support element is attached proximate a rear of the vehicle.

14. A sprayer assembly comprising:
a support element configured for attachment to a vehicle;
a first load carrying arm selectively extendable from the support element; and
a first nozzle carrying arm attached to a distal end of the first load carrying arm and having at least two sections connected at a first joint such that a first of the at least two sections extends from the first joint toward a first end of the nozzle arm and a second of the at least two sections extends from the first joint toward a second end of the nozzle arm such that nozzle carrying arm is attached to the distal end of the load carrying arm intermediate the first end and the second end of the nozzle arm, wherein the first section is selectively extendable such that the first end extends further away from the vehicle than the distal end of the load carrying arm, and the second section is selectively extendable such that the second end extends closer toward the vehicle than the distal end of the first load carrying arm.

15. The spray assembly of claim 14 wherein the first nozzle carrying arm is attached to the first load carrying arm proximate the first joint.

16. The spray assembly of claim 14 further comprising a second joint positioned proximate a longitudinal mid-point of the first load carrying arm.

17. A method of deploying a spray boom system, wherein a support element of the spray boom system is attached to a vehicle, the method comprising:
selectively extending a first load carrying arm from the support element;
selectively extending at least one of two sections of a first nozzle carrying arm from the first load carrying arm; and
changing a degree of bend in the first load carrying arm to thereby change a distance between at least one of the two sections of the first nozzle carrying arm and the vehicle.

18. The method of claim 17 further comprising:
selectively extending a second load carrying arm from the support element; and
selectively extending at least one of two sections of a second nozzle carrying arm from the second load carrying arm;
wherein the first load carrying arm is extended from a left side of the vehicle and wherein the second load carrying arm is extended from a right side of the vehicle.

19. The method of claim 17 further comprising changing a distance between the first nozzle carrying arm and a ground surface under the vehicle.

* * * * *